United States Patent
Yu

(10) Patent No.: US 9,411,689 B2
(45) Date of Patent: Aug. 9, 2016

(54) METHOD AND RELEVANT APPARATUS FOR STARTING BOOT PROGRAM

(71) Applicant: Huawei Technologies Co., Ltd., Shenzhen, Guangdong (CN)

(72) Inventor: Bingxu Yu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 180 days.

(21) Appl. No.: 14/479,772

(22) Filed: Sep. 8, 2014

(65) Prior Publication Data

US 2015/0074461 A1    Mar. 12, 2015

(30) Foreign Application Priority Data

Sep. 10, 2013   (CN) .......................... 2013 1 0410749

(51) Int. Cl.
*G06F 11/00* (2006.01)
*G06F 11/14* (2006.01)
*G06F 9/44* (2006.01)
*G06F 11/22* (2006.01)

(52) U.S. Cl.
CPC .......... *G06F 11/1417* (2013.01); *G06F 9/4406* (2013.01); *G06F 11/2284* (2013.01)

(58) Field of Classification Search
None
See application file for complete search history.

(56) References Cited

U.S. PATENT DOCUMENTS

| | | | | |
|---|---|---|---|---|
| 5,835,695 A * | 11/1998 | Noll | ..................... | G06F 11/1417 714/11 |
| 6,757,838 B1 * | 6/2004 | Chaiken | ................ | G06F 9/4403 714/15 |
| 7,395,397 B2 | 7/2008 | Ogawa | | |
| 2002/0099974 A1 * | 7/2002 | Lin | ...................... | G06F 11/1417 714/13 |
| 2002/0147941 A1 * | 10/2002 | Gentile | ............... | G06F 11/1417 714/36 |
| 2004/0153846 A1 | 8/2004 | Lee | | |
| 2006/0155979 A1 * | 7/2006 | Blinick | ............... | G06F 11/1417 713/2 |
| 2008/0046637 A1 * | 2/2008 | Katano | ............... | G06F 11/1417 711/103 |
| 2008/0126777 A1 * | 5/2008 | Chang | ................. | G06F 11/1417 713/2 |
| 2009/0150598 A1 * | 6/2009 | Jung | ................... | G06F 11/1666 711/103 |
| 2012/0239972 A1 * | 9/2012 | Shibata | ............... | G06F 11/1417 714/15 |

FOREIGN PATENT DOCUMENTS

| | | |
|---|---|---|
| CN | 101281493 A | 10/2008 |
| CN | 101727361 A | 6/2010 |
| CN | 101908023 A | 12/2010 |
| CN | 102402468 A | 4/2012 |
| KR | 20050021685 A | 3/2005 |

* cited by examiner

*Primary Examiner* — Gabriel Chu
(74) *Attorney, Agent, or Firm* — Leydig, Voit & Mayer, Ltd.

(57) ABSTRACT

A method and a relevant apparatus for starting a boot program are provided. The method includes: when a boot request is detected, determining whether a first physical block in a NAND flash is a bad block; reading first boot data stored in the first physical block if the first physical block is not a bad block; determining whether the read first boot data has a data error; re-reading the first boot data from a first backup block when the read first boot data has a data error; determining whether the first boot data that is re-read from the first backup block has a data error; when the first boot data that is re-read from the first backup block has no data error, continuing to process other boot data that needs to be read to start the boot program, until start of the boot program is complete.

16 Claims, 6 Drawing Sheets

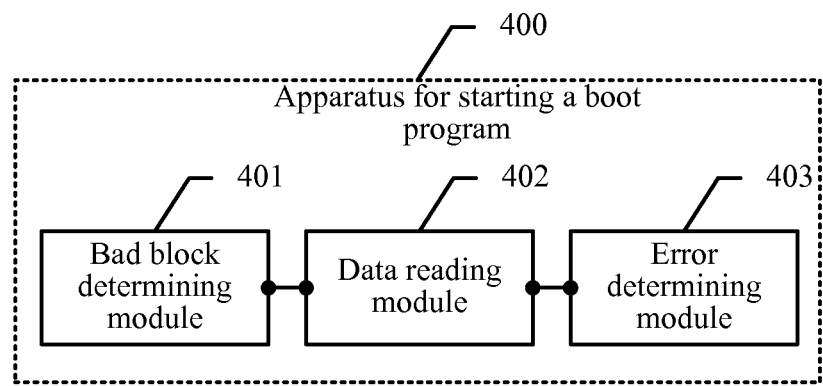
FIG. 4-a
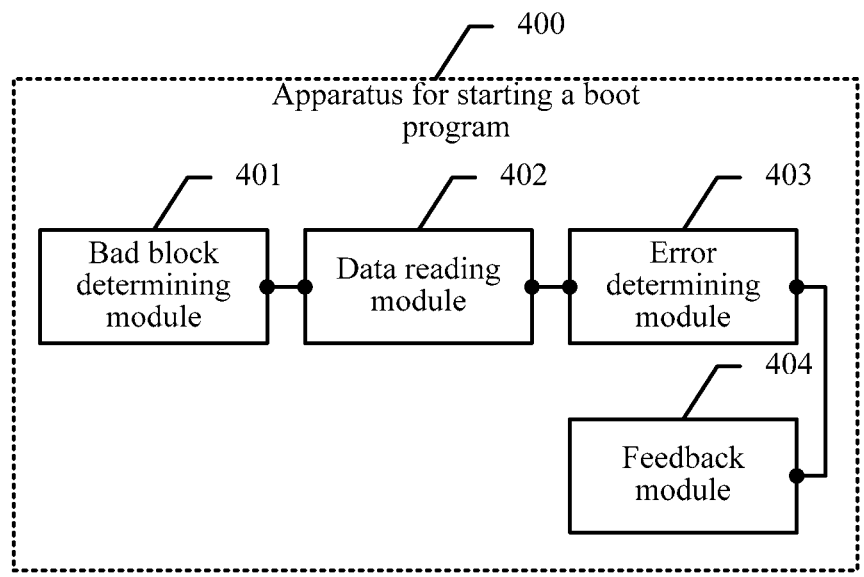
FIG. 4-b

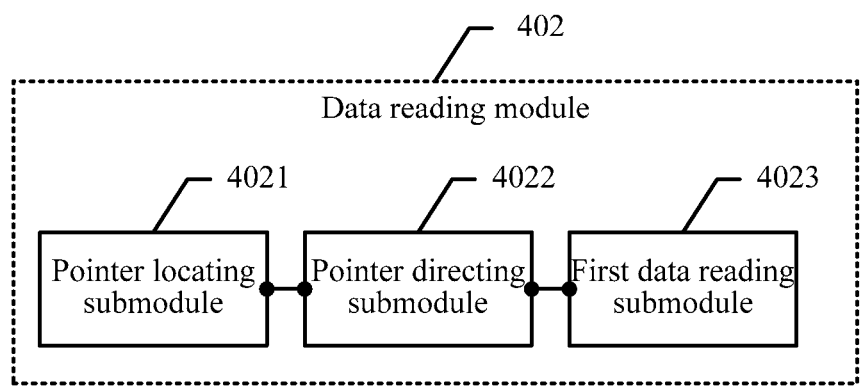
FIG. 4-c
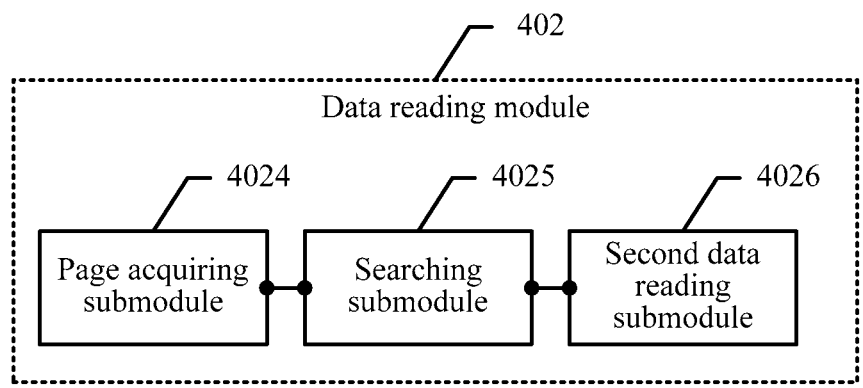
FIG. 4-d

METHOD AND RELEVANT APPARATUS FOR STARTING BOOT PROGRAM

CROSS-REFERENCE TO RELATED APPLICATION

This application claims priority to Chinese Patent Application No. 201310410749.9, filed on Sep. 10, 2013, which is hereby incorporated by reference in its entirety.

TECHNICAL FIELD

The present invention relates to the field of computer technologies, and in particular, to a method and a relevant apparatus for starting a boot program.

BACKGROUND

NAND flash is a kind of flash memory. A NAND flash memory has such advantages as a large capacity and a high rewriting speed, and is applicable to mass data storage. Therefore, the NAND flash memory is increasingly used in the industry, for example, in an embedded product including a digital camera, a Moving Picture Experts Group Audio Layer III (MP3) player, a small-sized USB flash drive, and the like. At present, NAND flash is often selected in a boot. Generally, only one piece of NAND flash is required to start a boot program. Because of a large capacity feature, a NAND flash may be adopted to start a program and store data, thereby reducing product costs.

A method for starting a boot program by using a NAND flash in the prior art mainly includes the following steps:

First read boot data; then use an Error Checking and Correction (ECC) algorithm to determine whether the boot data has an error; and if the boot data has an error, directly feed back a boot start failure, and the boot can start successfully when all the boot data is determined to be free of error by using the ECC algorithm.

However, in an implementation process of the present invention, all existing flash components are troubled by a bit switching phenomenon, and the NAND flash is no exception. That is, a problem of bit switching also exists in the NAND flash. For example, during use of the NAND flash, a certain bit of a storage unit may flip or may be reported to flip, resulting in a change to stored data. If the changed data is beyond a correction capacity of the ECC algorithm, it leads to a boot program start failure.

In addition, a problem of randomly-distributed bad blocks exists when a NAND flash component is delivered out of a factory. A bad block is a physical block that cannot be used. Likewise, during use of a NAND flash, a problem of a bad block may also randomly occur. A bad block randomly occurring to the NAND flash may also lead to a data error, so as to cause a boot program start failure.

SUMMARY

Embodiments of the present invention provide a method and a relevant apparatus for starting a boot program, to increase a probability of successful start of the boot program from a NAND flash.

To resolve the technical problems, the following technical solutions are provided in the embodiments of the present invention:

According to a first aspect, an embodiment of the present invention provides a method for starting a boot program, including:

when a boot request is detected, determining whether a first physical block operated in a NAND flash is a bad block;

reading first boot data stored in the first physical block if the first physical block is not a bad block;

determining whether the read first boot data has a data error;

if the read first boot data has a data error, re-reading the first boot data from a first backup block that is corresponding to the first physical block, where the first backup block is a physical block that backs up data in the first physical block; and determining whether the first boot data that is re-read from the first backup block has a data error, and if the first boot data that is re-read from the first backup block has no data error, continuing to process, according to a same manner of processing the first boot data, other boot data that needs to be read to start the boot program, until start of the boot program is complete.

With reference to the first aspect, in a first possible implementation manner of the first aspect, the determining whether a first physical block operated in a NAND flash is a bad block includes:

reading bad block mark information of the first physical block; and determining whether the first physical block is a bad block according to the bad block mark information.

With reference to the first aspect or the first possible implementation manner of the first aspect, in a second possible implementation manner of the first aspect, after the determining whether a first physical block operated in a NAND flash is a bad block, the method further includes:

if the first physical block is a bad block, determining whether a second physical block operated in the NAND flash is a bad block; and if the second physical block is a bad block, continuing to determine whether a third physical block operated in the NAND flash is a bad block, and if N consecutive physical blocks in the NAND flash are all determined to be bad blocks, feeding back a boot program start failure, where N is a preset boot start threshold and N is a non-zero natural number.

With reference to the first aspect, or the first or the second possible implementation manner of the first aspect, in a third possible implementation manner of the first aspect, the determining whether the read first boot data has a data error includes:

using an error checking and correction ECC algorithm to check and correct the read first boot data, and if the checking of the read first boot data by using the ECC algorithm fails, determining that the read first boot data has a data error.

With reference to the first aspect, or the first or the second or the third possible implementation manner of the first aspect, in a fourth possible implementation manner of the first aspect, the re-reading the first boot data from a first backup block that is corresponding to the first physical block includes:

locating an address of the first boot data that has a data error in the first physical block by using a pointer built in the NAND flash;

directing the pointer built in the NAND flash to an address that is the same as the located address and is in the first backup block; and re-reading the first boot data from the address that is the same as the located address and is in the first backup block.

With reference to the first aspect, or the first or the second or the third possible implementation manner of the first aspect, in a fifth possible implementation manner of the first aspect, the re-reading the first boot data from a first backup block that is corresponding to the first physical block includes:

acquiring an identity (ID) of a page on which the first boot data that has a data error in the first physical block exists;

searching, in the first backup block, for a page whose ID is the same as that of the page on which the first boot data that has a data error exists; and re-reading the first boot data according to the page that is found in the first backup block.

With reference to the first aspect, or the first or the second or the third or the fourth or the fifth possible implementation manner of the first aspect, in a sixth possible implementation manner of the first aspect, after the determining whether the first boot data that is re-read from the first backup block has a data error, the method further includes:

if the first boot data that is re-read from the first backup block has a data error, reading the first boot data again from a second backup block that is corresponding to the first physical block, where the second backup block is another physical block that backs up the data in the first physical block; and determining whether the first boot data read again from the second backup block has a data error, and if the first boot data read again from the second backup block has no data error, triggering execution of continuing to process, according to the same manner of processing the first boot data, other boot data that needs to be read to start the boot program, until the start of the boot program is complete.

With reference to the first aspect, or the first or the second or the third or the fourth or the fifth or the sixth possible implementation manner of the first aspect, in a seventh possible implementation manner of the first aspect, the continuing to process other boot data that needs to be read to start the boot program includes:

continuing to process, in the first backup block, other boot data than the first boot data; or jumping back to the first physical block to continue to process other boot data than the first boot data.

According to a second aspect, an embodiment of the present invention provides an apparatus for starting a boot program, including:

a bad block determining module, configured to, when a boot request is detected, determine whether a first physical block operated in a NAND flash is a bad block;

a data reading module, configured to, if the first physical block is not a bad block, read first boot data stored in the first physical block; and an error determining module, configured to determine whether the read first boot data has a data error; wherein the data reading module is further configured to, when the read first boot data has a data error, re-read the first boot data from a first backup block that is corresponding to the first physical block, where the first backup block is a physical block that backs up data in the first physical block; and the error determining module is further configured to determine whether the first boot data that is re-read from the first backup block has a data error; and when the first boot data that is re-read from the first backup block has no data error, continue to trigger, according to a same manner of processing the first boot data, the data reading module and the error determining module to process other boot data that needs to be read to start the boot program, until start of the boot program is complete.

With reference to the second aspect, in a first possible implementation manner of the second aspect, the bad block determining module is specifically configured to read bad block mark information of the first physical block; and determine whether the first physical block is a bad block according to the bad block mark information.

With reference to the second aspect, or the first possible implementation manner of the first aspect, in a second possible implementation manner of the second aspect, the apparatus for starting a boot program further includes: a feedback module, where:

the bad block determining module is further configured to, when the first physical block is a bad block, determine whether a second physical block operated in the NAND flash is a bad block;

the bad block determining module is further configured to continue to, when the second physical block is a bad block, determine whether a third physical block operated in the NAND flash is a bad block; and the feedback module is configured to feed back a boot program start failure when N consecutive physical blocks in the NAND flash are all determined to be bad blocks, where N is a preset boot start threshold and N is a non-zero natural number.

With reference to the second aspect, or the first or the second possible implementation manner of the second aspect, in a third possible implementation manner of the second aspect, the error determining module is specifically configured to use an error checking and correction ECC algorithm to check and correct the read first boot data, and if the checking of the read first boot data by using the ECC algorithm fails, determine that the read first boot data has a data error.

With reference to the second aspect, or the first or the second or the third possible implementation manner of the second aspect, in a fourth possible implementation manner of the second aspect, the data reading module includes:

a pointer locating submodule, configured to locate an address of the first boot data that has a data error in the first physical block by using a pointer built in the NAND flash;

a pointer directing submodule, configured to direct the pointer built in the NAND flash to an address that is the same as the located address and is in the first backup block; and a first data reading submodule, configured to re-read the first boot data from the address that is the same as the located address and is in the first backup block.

With reference to the second aspect, or the first or the second or the third possible implementation manner of the second aspect, in a fifth possible implementation manner of the second aspect, the data reading module includes:

a page acquiring submodule, configured to acquire an ID of a page on which the first boot data that has a data error in the first physical block exists;

a searching submodule, configured to search, in the first backup block, for a page whose ID is the same as that of the page on which the first boot data that has a data error exists; and a second data reading submodule, configured to re-read the first boot data according to the page that is found in the first backup block.

With reference to the second aspect, or the first or the second or the third or the fourth or the fifth possible implementation manner of the second aspect, in a sixth possible implementation manner of the second aspect, the data reading module is further configured to, when the error determining module determines that the first boot data that is re-read from the first backup block has a data error, read the first boot data again from a second back block that is corresponding to the first physical block, where the second backup block is another physical block that backs up the data in the first physical block; and the error determining module is further configured to determine whether the first boot data read again from the second backup block has a data error; and when the first boot data read again from the second backup block has no data error, trigger the data reading module and the error determining module to process other boot data that needs to be read to start the boot program, until the start of the boot program is complete.

With reference to the second aspect, or the first or the second or the third or the fourth or the fifth or the sixth possible implementation manner of the second aspect, in a seventh possible implementation manner of the second aspect, the data reading module is further configured to continue to read, in the first backup block, other boot data than the first boot data, or jump back to the first physical block to continue to read other boot data than the first boot data; and the error determining module is further configured to continue to determine, in the first backup block, whether the other boot data than the first boot data has a data error, or jump back to the first physical block to continue to determine whether the other boot data than the first boot data has a data error.

It can be learned from the technical solutions that the embodiments of the present invention have the following advantages:

In the embodiments of the present invention, after a boot request is initiated by a user, when the boot request is detected, it is first determined whether a first physical block currently operated in a NAND flash is a bad block; then first boot data stored in the first physical block is read if the first physical block is not a bad block; then it is determined whether the read first boot data has a data error; then the first boot data is re-read from a first backup block when the read first boot data has a data error; then it is determined whether the first boot data that is re-read from the first backup block has a data error; and when the first boot data that is re-read from the first backup block has no data error, other boot data that needs to be read to start a boot program continues to be processed according to a same manner of processing the first boot data, until start of the boot program is complete. Because bad block determination is performed on the first physical block currently operated in the NAND flash, a problem of boot program start failure caused by a bad block problem occurring when the NAND flash is delivered out of a factory or during use of the NAND flash can be avoided. In addition, when the read first boot data has a data error, the first boot data may be re-read from the first backup block that is corresponding to the first physical block. In this way, a remedy can be taken when a data error is found, and the re-read first boot data can still be used to start the boot program. Compared with the prior art where a boot failure is directly fed back when a data error occurs, a probability of successful start of the boot program can be increased.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of skilled in the art may still derive other drawings from these accompanying drawings.

FIG. 4-a is a schematic composition diagram of an apparatus for starting a boot program according to an embodiment of the present invention;

FIG. 4-b is a schematic composition diagram of another apparatus for starting a boot program according to an embodiment of the present invention;

FIG. 4-c is a schematic composition diagram of a data acquiring module according to an embodiment of the present invention;

FIG. 4-d is a schematic composition diagram of another data acquiring module according to an embodiment of the present invention.

DESCRIPTION OF EMBODIMENTS

Embodiments of the present invention provide a method and relevant apparatus for starting a boot program, to increase a probability of successful start of the boot program from a NAND flash.

To make the objectives, features, and advantages of the embodiments of the present invention clearer, the following clearly describes the technical solutions in the embodiments of the present invention with reference to the accompanying drawings in the embodiments of the present invention. Apparently, the described embodiments are merely a part rather than all of the embodiments of the present invention. All other embodiments acquired by persons skilled in the art based on the embodiments of the present invention shall fall within the protection scope of the present invention.

Terms such as "a first", "a second" in the specification, claims, and the accompanying drawings of the present invention are used to distinguish between similar objects, and are not necessarily used to describe a specific sequence or order. It should be understood that the terms are interchangeable under appropriate circumstances, and are merely used to distinguish objects with similar attributes when describing the embodiments of the present invention. Furthermore, terms "include" and "have" and any variations thereof are intended to cover a non-exclusive inclusion. For example, a process, a method, a system, a product, or a device that includes a series of units, is not necessarily limited to expressly listed steps or units, but may include other units that are not expressly listed or that are inherent to such process, method, product, or device.

An embodiment of a method for starting a boot program according to the present invention may be applied to reliably starting a boot program from a NAND flash, and may include: when a boot request is detected, determining whether a first physical block operated in the NAND flash is a bad block; reading first boot data stored in the first physical block if the first physical block is not a bad block; determining whether the read first boot data has a data error; if the read first boot data has a data error, re-reading the first boot data from a first backup block that is corresponding to the first physical block, where the first backup block is a physical block that backs up data in the first physical block; and determining whether the first boot data that is re-read from the first backup block has a data error; and if the first boot data that is re-read from the first backup block has no data error, continuing to process, according to a same manner of processing the first boot data, other boot data that needs to be read to start the boot program, until start of the boot program is complete.

Figure 1:
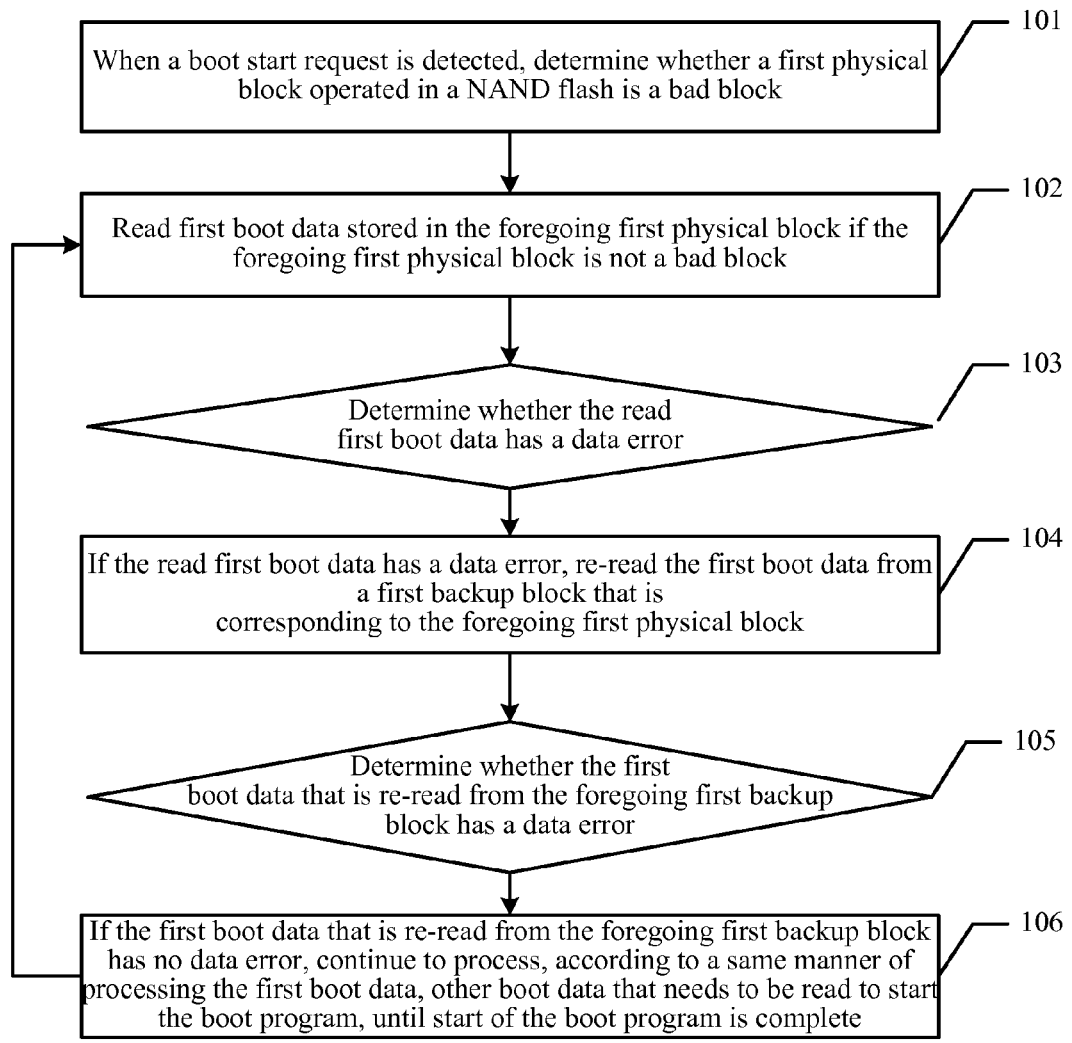
FIG. 1 is a schematic block diagram of a procedure of a method for starting a boot program according to an embodiment of the present invention.

A method for starting a boot program provided in an embodiment of the present invention, referring to FIG. 1, specifically includes the following steps:

101: When a boot request is detected, determine whether a first physical block operated in a NAND flash is a bad block.

In this embodiment of the present invention, after a user initiates a boot request, detection for the boot request initiated by the user is performed. If the boot request is successfully detected, determination is first performed on a physical block currently operated in the NAND flash. That the physical block current operated in the NAND flash is "the first physical block" is used as an example to provide a detailed description. Whether the first physical block is a bad block is determined, where a bad block is a physical block that cannot be normally used. The bad block cannot ensure correctness and reliability of data, and is a physical block that cannot be used.

It should be noted that, in the prior art, after a boot request of a user is detected, boot data is directly read. A boot program start failure is directly fed back when a data error is found in the boot data. In other words, in the prior art, no remedy can be taken for a data error in the boot data, and direct feedback of the boot program start failure may result in a low probability of success start of the boot program. In addition, as a storage medium, a feature of a NAND flash component inevitably leads to existence of a bad block problem. Specifically, the probability of the NAND flash component in having a bad block is usually around 2%. Such a high bad block probability severely affects a probability of successful start of the boot program. In addition, the NAND flash component may have a random bad block during repeated uses, and this kind of bad block problem may further increase a probability of boot program start failure.

To increase the probability of successful start of the boot program, in this embodiment of the present invention, after the boot request of the user is detected, the data is not directly read; instead, bad block determination is performed on the physical block currently operated in the NAND flash; and only when the physical block currently operated is a good block, step 102 is triggered. In this way, a problem of a boot program start failure caused by the bad block can be fundamentally overcome. In this embodiment of the present invention, bad block determination is first performed on the physical block currently operated in the NAND flash. This is an implementation manner different from the prior art. This manner of first determining a bad block is an implementation manner proposed when a technical bias caused by common technical means is overcome, and can fundamentally increase the probability of successful start of the boot program.

In addition, in this embodiment of the present invention, bad block determination is only performed on the physical block currently operated in the NAND flash. The bad block determination performed on a single physical block does not affect a start speed of the boot program, but can greatly avoid the boot program start failure. In this embodiment of the present invention, an instruction sent by a Central Processing Unit (CPU) may be used to determine which physical block is to be operated in the NAND flash. For ease of description, in this embodiment of the present invention, the physical block currently operated in the NAND flash is defined as "a first physical block", and certainly, other description manners may be adopted, for example, "a specific physical block", or "a certain physical block". The description here is for description only.

Step 101 of determining whether a first physical block operated in a NAND flash is a bad block may specifically include the following steps:

A1: Read bad block mark information of the first physical block.

A2: Determine whether the first physical block is a bad block according to the bad block mark information.

In step A1, the bad block mark information of the physical block may be first acquired. When a physical block becomes a bad block, the physical block may be marked as a bad block, and the physical block marked as a bad block is a physical block that cannot be normally used. In step A2, after the bad block mark information of the first physical block is acquired, whether the first physical block is a bad block may be determined according to the bad block mark information. For example, a first byte of a spare area on a page of a physical block is used to represent a bad block mark. If the bad block mark is FF (11111111), it means that the first physical block is a good block, that is, the first physical block is not a bad block; and if the bad block mark is not FF, it means that the first physical block is a bad block.

It should be noted that, in this embodiment of the present invention, a manner of determining whether the first physical block is a bad block is not limited to the manner of using a bad block mark, and there may be other implementation manners. For example, a specific storage position in a block that is pre-determined in the NAND flash may be directly used to indicate a bad block; if the storage position is empty, it means that the physical block is a good block; and when there is data stored in the storage position, it means that the physical block is a bad block. Therefore, implementation manners based on this embodiment of the present invention may further include other methods for determining a bad block, which is not limited herein.

It should be noted that, in this embodiment of the present invention, after step 101 of determining whether a first physical block operated in a NAND flash is a bad block, the method may further include the following steps:

B1: If the first physical block is a bad block, determine whether a second physical block operated in the NAND flash is a bad block.

B2: If the second physical block is a bad block, continue to determine whether a third physical block operated in the NAND flash is a bad block, and if N consecutive physical blocks in the NAND flash are all determined to be bad blocks, feed back a boot program start failure NAND, where the N is a preset boot start threshold.

In step B1, when the first physical block is a bad block, it means that the first physical block cannot be normally used, so the boot data is not read from the first physical block any more; instead, another physical block operated in the NAND flash is reselected, on which bad block determination is performed. For ease of description, the another physical block operated in the NAND flash is defined as "a second physical block"; for a bad block determination manner for the second physical block, refer to the bad block determination manner for the first physical block described in the foregoing embodiment. Details are not described herein again.

After the bad block determination is performed on the second physical block in step B1, if the second physical block is not a bad block, boot data stored in the second physical block may be read. It should be noted that what is described in steps 102 to 106 in this embodiment of the present invention is a manner of processing the first boot data in the first physical block. If the first physical block is determined to be a bad block by using the bad block determination on the first physical block in step 101, and the second physical block is determined to be a good block by using the bad block determination on the second physical block in step B1, what is described in subsequent steps 102 to 106 should be processing of the second physical block, that is, a processing object of the first physical block in steps 102 to 106 is replaced with the second physical block. The description here is for description only.

In step B2, when the second physical block is determined to be a bad block, step B1 is performed again. A difference is that the processing object is another physical block operated in the NAND flash. For ease of description, the another physical block operated in the NAND flash is defined as "a third physical block". By performing this kind of bad block determination on multiple physical blocks in the NAND flash, a physical block that is not a bad block in the NAND flash is determined, and the boot program start failure caused by a data error occurring during reading of the boot data stored in the physical block is avoided. The problem of a boot program start failure caused by a bad block can be resolved and a success rate of boot program start is increased.

In step B2, when the third physical block is also a bad block, it may continue to determine whether a fourth physical block is a bad block until a physical block that is not a bad block in the NAND flash is found. It should be noted that, to improve efficiency of starting the boot program, a boot start threshold may be set. The boot start threshold N is used as an example, where N is a non-zero natural number. When N consecutive physical blocks in the NAND flash are determined to be bad blocks, other physical blocks in the NAND flash are not read further and a boot program start failure is directly fed back.

102: Read the first boot data stored in the first physical block if the first physical block is not a bad block.

In this embodiment of the present invention, the first boot data stored in the first physical block is read only if the first physical block is not a bad block. It is understandable that, in this embodiment of the present invention, the bad block determination is a cyclic process. When the first physical block is a bad block, it is required to determine whether the second physical block in the NAND flash is a bad block, until a physical block that is not a bad block in the NAND flash is found. In step 102, data reading is performed on a physical block that is a good block in the NAND flash. However, in the description of step 102, the first physical block is used as a processing object. In a practical application, it is required to decide which physical block is the processing object specifically according to a result of bad block determination on the physical blocks in the NAND flash. The description here is for description only.

A NAND flash is usually formed by a number of blocks, where a size of a block is generally 128 KB, 256 KB, 512 KB, 1 MB, or the like. Each block further includes many pages, where a size of a page may specifically be 2 KB, 4 KB, 8 KB, 16 KB, or the like. It should be noted that, in this embodiment of the present invention, the NAND flash uses a byte as a smallest readable unit. Therefore, in this embodiment of the present invention, the read first boot data stored in the first physical block may be several bytes, a first half of a page, a latter half of a page, an entire page, or the like. A volume of the read first boot data stored in the first physical block needs to be specifically decided with reference to an application scenario.

103: Determine whether the read first boot data has a data error.

In this embodiment of the present invention, after the first boot data is read from the first physical block, it is determined whether the first boot data read from the first physical block has a data error. When the first boot data has a data error, step 104 is triggered; when the first boot data has no data error, other boot data that needs to be read to start the boot program is continuously read. For example, two physical blocks that need to be used to start the boot program are respectively block 1 and block 2. After boot 1 in the block 1 is read and no data error is found, boot 2 in the block 1 is then read and whether the boot 2 has a data error is determined; if the boot 2 has a data error, step 104 is also performed; and if the boot 2 also has no data error, data in the block 1 is continuously read. After the block 1 is completely read, the boot data in the block 2 is continuously read, until the start of the boot program is complete.

In this embodiment of the present invention, commonly-used NAND flash components, in terms of internal cell, may be divided into two types: Single Level Cell (SLC) and Multi-Level Cell (MLC). An SLC NAND flash has a high stability, but an MLC NAND flash has a poor stability. Compared with the SLC (in which a cell stores only 1 bit), a cell in the MLC NAND flash stores 2 bits. Therefore, a level threshold and a probability of bit flipping are increased. As a result, when the MLC NAND flash is used, due to its low reliability, the stability must be improved to reduce a probability of occurrence of a data error during use.

It should be noted that, step 103 of determining whether the read first boot data has a data error may specifically include:

using an ECCECC algorithm to check and correct the read first boot data, and if the checking of the first boot data by using the ECC algorithm fails, determining that the read first boot data has a data error.

104: Re-read the first boot data from a first backup block that is corresponding to the first physical block if the read first boot data has a data error, where the first backup block is a physical block that backs up data in the first physical block.

In this embodiment of the present invention, to prevent a data error from occurring in a process of starting the boot program, boot data used to start the boot program may be backed up. For example, the boot data stored in the first physical block may be backed up, and the backup boot data is stored in another physical block. In this embodiment of the present invention, the physical block that stores the backup boot data is called "a first backup block".

In the prior art, a boot program start failure is fed back when read boot data is determined to have a data error, or when the checking by using an ECC fails. It can be learned based on analysis of the content that some bits in a cell of a NAND flash in use may flip, causing a change to stored data; and a data error may occur to the read boot data when the changed data is beyond a maximum correction capacity of the ECC. In this embodiment of the present invention, to prevent a boot program start failure caused by a data error with the read first boot data, the first boot data may be re-read from a first backup block that is corresponding to the first physical block; and by re-reading the first boot data from the backup data, a probability of successful start of the boot program is increased.

It should be noted that, step 104 of re-reading the first boot data from a first backup block that is corresponding to the first physical block includes the following steps:

C1: Locate an address of the first boot data that has a data error in the first physical block by using a pointer built in the NAND flash.

C2: Direct the pointer built in the NAND flash to an address that is the same as the located address and is in the first backup block.

C3: Re-read the first boot data from the address that is the same as the located address and is in the first backup block.

By performing step C1, the address of the first boot data that has a data error in the first physical block is first found. Because the first backup block is a backup of the data stored in the first physical block, in step C2, the address that is the same as the located address and is in the first backup block can be directed by using the pointer built in the NAND flash. Finally, by performing step C3, the first boot data can be re-read from the first backup block.

In some other embodiments of the present invention, in step 104 of re-reading the first boot data from a first backup block that is corresponding to the first physical block, another implementation manner may be adopted and may specifically include the following steps:

C4: Acquire an identity (ID) of a page on which the first boot data that has a data error in the first physical block exists.

C5: Search, in the first backup block, for a page whose ID is the same as that of the page on which the first boot data that has a data error exists.

C6: Re-read the first boot data according to the page that is found in the first backup block.

By performing step C4, the ID of the page on which the first boot data has a data error in the first physical block exists is first found. Because the first backup block is the backup of the data stored in the first physical block, in step C5, the page with the same ID can be found by using the first backup block. Finally, by performing step C6, the first boot data can be re-read from the first backup block.

105: Determine whether the first boot data that is re-read from the first backup block has a data error.

In this embodiment of the present invention, after the first boot data is read from the first backup block, it is determined whether the first boot data that is re-read from the first backup block has a data error, where, the determining whether the first boot data that is re-read has a data error in step 105 is similar to the manner of determining whether the first boot data has a data error in step 103 in the content. Details are not described herein again. If the first boot data that is re-read from the first backup block has no data error, step 106 is triggered.

106: If the first boot data that is re-read from the first backup block has no data error, continue to process, according to the same manner of processing the first boot data, other boot data that needs to be read to start the boot program, until the start of the boot program is complete.

In this embodiment of the present invention, step 106 describes the processing of other boot data that needs to be read to start the boot program when it is determined, in step 105, that the first boot data that is re-read from the first backup block has no data error; a processing manner may be the same as the manner of processing the first boot data. In other words, the other boot data that needs to be read to start the boot program serves as a processing object to re-perform steps 102 to 106. What is different from steps 102 to 106 is that, the processing of the first boot data is described in steps 102 to 106, but when steps 102 to 106 are performed again, the processing object is the other boot data that needs to be read to start the boot program.

The continuing to process other boot data that needs to be read to start the boot program, as described in the step 106, may include the following step:

continue to process, in the first backup block, other boot data than the first boot data; or jump back to the first physical block to continue to process other boot data than the first boot data.

That is, in this embodiment of the present invention, when the first boot data stored in the first physical block has a data error, the first boot data may be re-read from the first backup block; and when the boot data that is re-read is determined to have no data error, because the boot data stored in the first physical block and the first backup block are the same, the process may continue to read, from the first backup block, other boot data than the first boot data. Certainly, the process may jump back to the first physical block to continue to process other boot data than the first boot data. By using these two manners, flexibility of reading boot data can be improved.

It should be noted that, in some other embodiments of the present invention, after step 105 of determining whether the first boot data that is re-read from the first backup block has a data error, when the first boot data that is re-read has no data error, this embodiment of the present invention may further include the following steps:

Read the first boot data again from a second backup block that is corresponding to the first physical block if the first boot data that is re-read from the first backup block has a data error, where the second backup block is another physical block that backs up the data in the first physical block.

Determine whether the first boot data read again from the second backup block has a data error. If the first boot data read again from the second backup block has no data error, trigger execution of continuing to process, according to the same manner of processing the first boot data, other boot data that needs to be read to start the boot program, until the start of the boot program is complete.

That is, to prevent a data error from occurring in a process of starting the boot program, boot data that is used to start the boot program may be backed up. For example, a double backup may be performed on the boot data stored in the first physical block, and the backup boot data may be stored in two physical blocks. In this embodiment of the present invention, the physical blocks that store the backup boot data are respectively called "a first backup block" and "a second physical block". When the first boot data that is re-read from the first backup block has a data error, the first boot data is read again from the second physical block. By using the double backup manner, the probability of successful start of the boot program can be further increased.

It can be learned from the embodiment description that, after a boot request is initiated by a user, when the boot request is detected, it is first determined whether a first physical block currently operated in a NAND flash is a bad block; then first boot data stored in the first physical block is read if the first physical block is not a bad block; then it is determined whether the read first boot data has a data error; then the first boot data is re-read from a first backup block when the read first boot data has a data error; then it is determined whether the first boot data that is re-read from the first backup block has a data error; and when the first boot data that is re-read from the first backup block has no data error, other boot data that needs to be read to start a boot program continues to be processed according to a same manner of processing the first boot data, until start of the boot program is complete. Because bad block determination is performed on the first physical block currently operated in the NAND flash, a problem of boot program start failure caused by a bad block problem occurring when the NAND flash is delivered out of a factory or during use of the NAND flash can be avoided. In addition, when the read first boot data has a data error, the first boot data may be re-read from the first backup block that is corresponding to the first physical block. In this way, a remedy can be taken when a data error is found, and the re-read first boot data can still be used to start the boot program. Compared with the prior art where a boot failure is directly fed back when a data error occurs, a probability of successful start of the boot program can be increased.

To better understand and implement the solution in this embodiment of the present invention, a corresponding application scenario is used as an example in the following detailed description.

Figure 2:
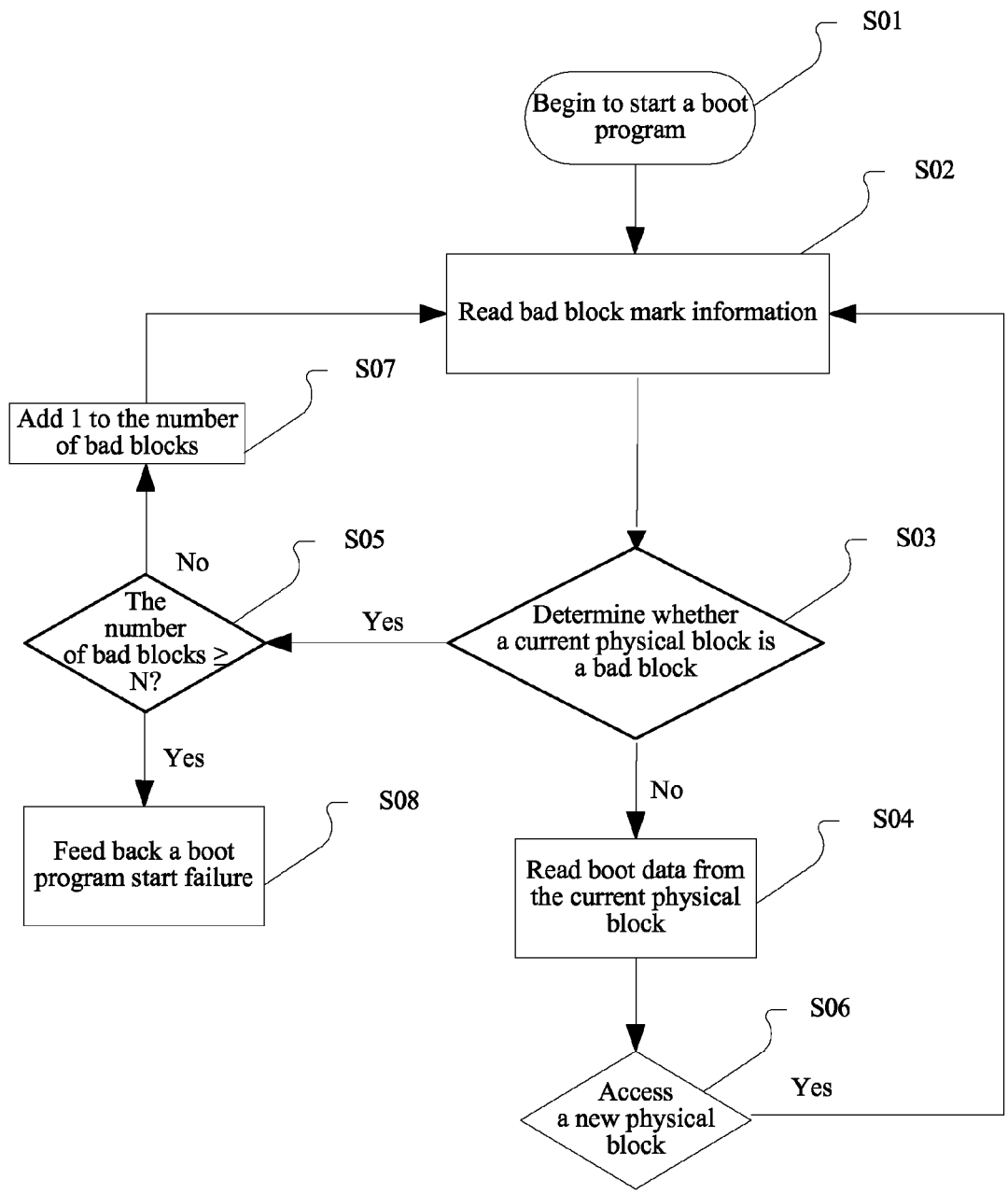
FIG. 2 is a flowchart of an implementation manner of skipping a bad block in a process of starting a boot program according to an embodiment of the present invention.

Refer to FIG. 2, which is a flowchart of an implementation manner of skipping a bad block in a process of starting a boot program according to an embodiment of the present invention. The implementation manner may include the following steps:

S01: Begin to perform an operation on a physical block in a NAND flash when a boot request initiated by a user is detected.

S02: Read bad block mark information.

S03: Determine whether the physical block currently operated in the NAND flash is a bad block. If the currently operated physical block is not a bad block, perform step S04, and if the currently operated physical block is a bad block, perform step S05.

S04: Begin to read boot data in the current physical block if the bad block mark information of the current physical block is FF, which means that the current physical block is a good block; and trigger execution of step S06 if it is required to access a new physical block when the boot data is read from the current physical block.

S05: Determine the number of consecutive physical blocks that are determined to be bad blocks in the NAND flash if the bad block mark information of the current physical block is not FF, which means that the current physical block is a bad block; trigger execution of step S07 if the number of the consecutive physical blocks that are determined to be bad blocks is less than a boot start threshold (that is, N); and trigger execution of step S08 if the number of the physical blocks that are determined to be bad blocks is greater than or equal to N.

It should be noted that, the bad block mark information may be specifically stored in a first byte in a spare area of the NAND flash. As a result, bad block determination may be performed by reading the first byte in the spare area when the boot program is started. The maximum number of consecutive bad blocks may be defined according to reliability of a component. For example, if the maximum number is configured as 5, when 5 consecutive blocks are bad blocks, it is considered that the boot program fails to start. If a probability of random occurrence of bad blocks in the NAND flash is 2%, a probability that 5 consecutive physical blocks are all bad blocks is $2\% \times 2\% \times 2\% \times 2\% \times 2\% = 3.2 \times 10^{-9}$. Then a probability of boot program start failure is already very low; a requirement on the reliability of a NAND flash component can be met.

S06: If it is required to access a new physical block when the boot data in the current physical block is read, trigger step S02 to perform bad block detection again to search for a next good block.

S07: If the counted number of the consecutive physical blocks that are determined to be bad blocks in the NAND flash increases by 1, trigger step S02 to perform the bad block detection again on another physical block that is operated in the NAND flash.

S08: When the number of the consecutive physical blocks that are determined to be bad blocks is greater than or equal to N, feed back the boot program start failure if the reliability tolerance of the NAND flash component is exceeded.

By cyclically performing the steps S02 to S07 for several times, the start of the boot program is complete when all the boot data that needs to be read to start the boot program is read.

Figure 3:
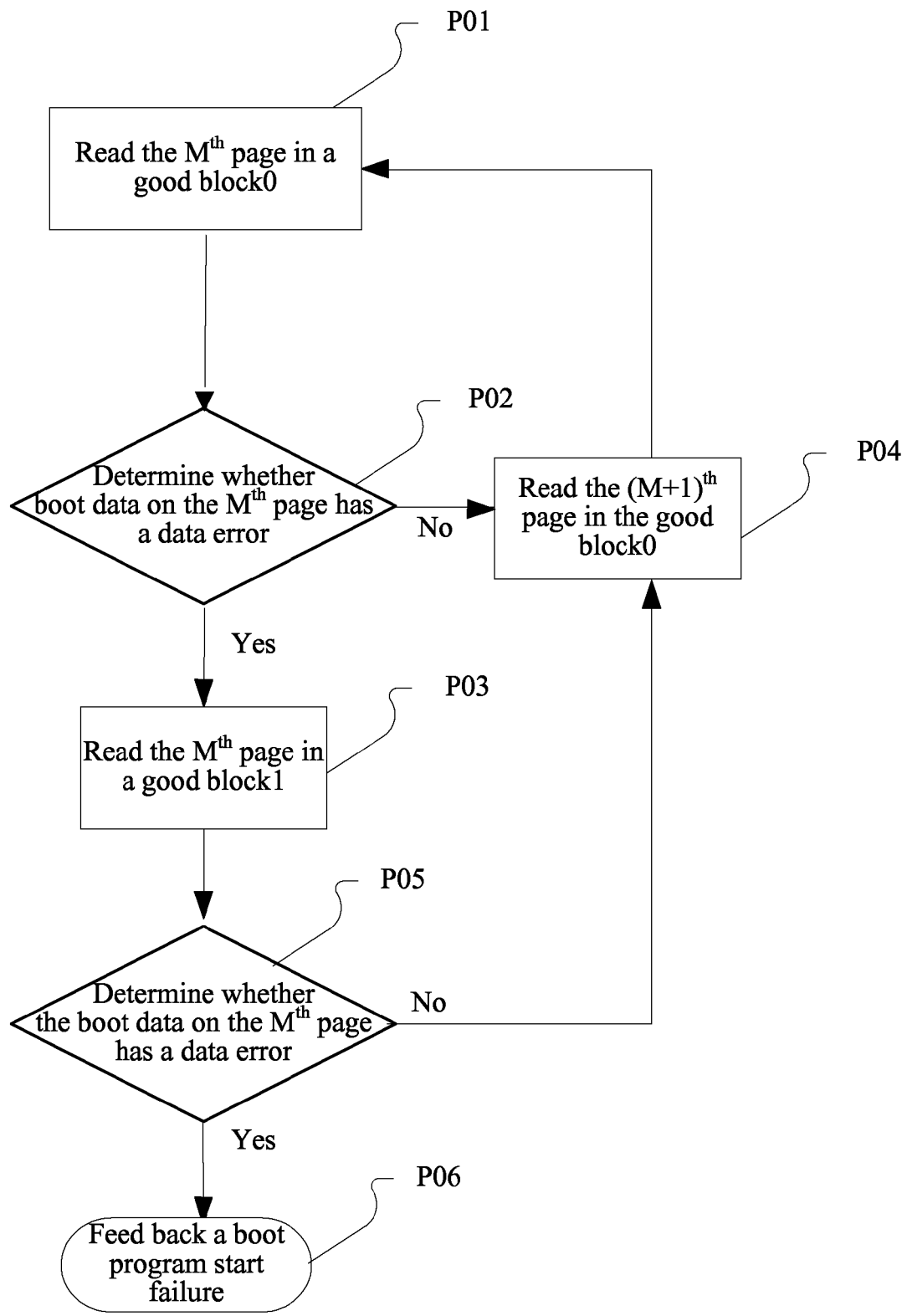
FIG. 3 is a flowchart of an implementation manner of using a backup block to start a boot program in a process of starting the boot program according to an embodiment of the present invention.

A problem of boot program start failure caused by a bad block can be excluded by using the flowchart shown in FIG. 2. For a circumstance that a data reading error also occurs when a good block is read, a double-image booting manner is used as an example in description in this embodiment. That is, backup is performed on boot data stored in a current physical block. Refer to FIG. 3, which is a flowchart of an implementation manner of determining whether read boot data has a data error in a process of starting a boot program according to an embodiment of the present invention. The implementation manner may include the following steps:

P01: Start the boot program when it is determined that the current physical block is not a bad block. First read the boot data from the current physical block. In FIG. 3, a good block0 is used as an example of the current physical block and is read, and the $M^{th}$ page of the good block0 is supposed to be read, where M is a natural number.

P02: Determine whether boot data on the $M^{th}$ page has a data error after being checked and corrected by using an ECC algorithm; trigger execution of step P03 if it is found that the correction fails; and trigger execution of step P04 if no data error is found with the boot data on the $M^{th}$ page.

P03: Jump back to a backup block of the current physical block (for example, good block1) to read the boot data again on a same page in the backup block (that is, jumping to the $M^{th}$ page of the backup block), and then perform step P05.

One physical block in a NAND flash includes many pages. For example, one physical block has 64 pages, 128 pages, or 256 pages. A same page refers to a page with a same page number in a physical block, the $M^{th}$ page, for example.

P04: Continue to read boot data on the $(M+1)^{th}$ page in the good block0 if no data error is found with the boot data on the $M^{th}$ page, and then trigger execution of step P02 again, that is, determine whether the boot data on the $(M+1)^{th}$ page has a data error.

It should be noted that, continuing to read the $(M+1)^{th}$ page after the $M^{th}$ page is read is used as an example here for illustration. In a practical application, boot data on other pages may be read after the $M^{th}$ page is read. The description here is for description only.

After the boot data on the $M^{th}$ page of the backup block is read, return to the original physical block (good block0) to perform subsequent starting operations. The boot data in the backup block is only read when an error occurs to the original physical block.

P05: Determine whether the boot data on the $M^{th}$ page has a data error after the boot data of the $M^{th}$ page in the backup block is read; perform step P06 if it is found that the correction fails; and trigger execution of step P04 if no data error is found with the boot data on the $M^{th}$ page.

P06: Feed back a boot program start failure.

It can be learned from the examples that, by using this kind of manner of starting a boot program, a probability of a boot program start failure caused by a data error occurring during reading of boot data can be greatly reduced. The boot program start failure occurs only when a same page in the backup block cannot be used in error correction. It can be learned from the analysis that such probability is very low and is sufficient to meet a reliability requirement of a NAND flash component. In addition, in this embodiment of the present invention, when a data error occurs, it is required to read only data on one more page (that is, the data stored on the same page in a same block in the backup block). In this way, a speed of starting the boot program can be effectively ensured.

It can be learned from the examples that a method that combines bad block skipping and double-image booting can improve the reliability of boot program starting. The bad block skipping function can effectively ensure that a boot program start failure caused by a bad block does not occur when a NAND flash is used. The double-image booting may read data from a same position in the backup block, and thereby further reduce the probability of boot program start failure caused by an ECC failure. By using the methods for improving reliability, the reliability can be well ensured when the NAND flash, or even when an MLC NAND flash, is used; meanwhile, only two blocks are required to reliably start the boot program when the ECC fails.

It should be noted that, for ease of description, each method embodiment is described as a combination of a series of actions. However, persons skilled in the art should understand that the present invention is not limited to the described sequence of actions, because certain steps according to the present application may be performed in other sequences or concurrently. In addition, persons skilled in the art should also understand that the embodiments described in the specification are all exemplary embodiments, and the actions and modules involved are not necessarily required by the present invention.

To better implement the solutions in this embodiment of the present invention, a relevant apparatus used to implement the solutions is provided in the following.

Refer to FIG. 4-a. A apparatus 400 for starting a boot program according to an embodiment of the present invention is provided, which may include: a bad block determining module 401, a data reading module 402, and an error determining module 403, where the bad block determining module 401 is configured to, when a boot request is detected, determine whether a first physical block operated in a NAND flash is a bad block;

the data reading module 402 is configured to, if the first physical block is not a bad block, read first boot data stored in the first physical block;

the error determining module 403 is configured to determine whether the read first boot data has a data error;

the data reading module 402 is further configured to, when the read first boot data has a data error, re-read the first boot data from a first backup block that is corresponding to the first physical block, where the first backup block is a physical block that backs up data in the first physical block; and the error determining module 403 is further configured to determine whether the first boot data that is re-read from the first backup block has a data error, and when the first boot data that is re-read from the first backup block has no data error, continue to trigger, according to a same manner of processing the first boot data, the data reading module and the error determining module to process other boot data that needs to be read to start the boot program, until start of the boot program is complete.

The bad block determining module 401 is specifically configured to read bad block mark information of the first physical block; and determine whether the first physical block is a bad block according to the bad block mark information.

Referring to FIG. 4-b, the apparatus 400 for starting a boot program provided in this embodiment of the present invention further includes: a feedback module 404, where the bad block determining module 401 is further configured to, when the first physical block is a bad block, determine whether a second physical block operated in the NAND flash is a bad block;

the bad block determining module 401 is further configured to, when the second physical block is a bad block, continue to determine whether a third physical block operated in the NAND flash is a bad block; and the feedback module 404 is configured to feed back a boot program start failure when N consecutive physical blocks in the NAND flash are determined to be bad blocks, where N is a preset boot start threshold and N is a non-zero natural number.

The error determining module 403 is specifically configured to use an error checking and correction ECC algorithm to check and correct the read first boot data; and determine that the read first boot data has a data error if the checking of the read first boot data using the ECC algorithm fails.

Referring to FIG. 4-c, the data reading module 402 provided in this embodiment of the present invention includes:

a pointer locating submodule 4021, configured to locate an address of the first boot data that has a data error in the first physical block by using a pointer built in the NAND flash;

a pointer directing submodule 4022, configured to direct the pointer built in the NAND flash to an address that is the same as the located address and is in the first backup block; and a first data reading submodule 4023, configured to re-read the first boot data from the address that is the same as the located address and is in the first backup block.

Referring to FIG. 4-d, the data reading module 402 provided in this embodiment of the present invention includes:

a page acquiring submodule 4024, configured to acquire an ID of a page on which the first boot data that has a data error in the first physical block exists;

a searching submodule 4025, configured to search, in the first backup block, for a page whose ID is the same as that of the page on which the first boot data that has a data error exists; and a second data reading submodule 4026, configured to re-read the first boot data according to the page that is found in the first backup block.

The data reading module 402 is further configured to, when the error determining module 403 determines that the first boot data that is re-read from the first backup block has a data error, read the first boot data again from a second back block that is corresponding to the first physical block, where the second backup block is another physical block that backs up the data in the first physical block; and the error determining module 403 is further configured to determine whether the first boot data read again from the second backup block has a data error, and when the first boot data read again from the second backup block has no data error, trigger the data reading module and the error determining module to process other boot data that needs to be read to start the boot program, until the start of the boot program is complete.

In some other embodiments of the present invention, the data reading module 402 is further configured to continue to read, in the first backup block, other boot data than the first boot data, or jump back to the first physical block to continue to read other boot data than the first boot data; and the error determining module 403 is further configured to continue to determine, in the first backup block, whether the other boot data than the first boot data has a data error, or jump back to the first physical block to continue to determine whether the other boot data than the first boot data has a data error.

It can be learned from the embodiments shown in FIG. 4-a to FIG. 4-d that, after a boot request is initiated by a user, when the boot request is detected, a bad block determining module first determines whether a first physical block currently operated in a NAND flash is a bad block. Then a data reading module reads first boot data stored in the first physical block if the first physical block is not a bad block. Then an error determining module determines whether the read first boot data has a data error. The data reading module re-reads the first boot data from a first backup block when the read first boot data has a data error. The error determining module determines whether the first boot data that is re-read from the first backup block has a data error, and when the first boot data that is re-read from the first backup block has no data error, the data reading module and the error determining module continue to process, according to the same manner of processing the first boot data, other boot data that needs to be read to start the boot program, until the start of the boot program is complete. Because bad block determination is performed on the first physical block currently operated in the NAND flash, a problem of boot program start failure caused by a bad block problem occurring when the NAND flash is delivered out of a factory or during use of the NAND flash can be avoided. In addition, when the read first boot data has a data error, the first boot data may be re-read from the first backup block that is corresponding to the first physical block. In this way, a remedy can be taken when a data error is found, and the re-read first boot data can still be used to start the boot program. Compared with the prior art where a boot failure is directly fed back when a data error occurs, a probability of successful start of the boot program can be increased.

An embodiment of the present invention further provides a computer storage medium, where the computer storage medium stores a program and the program performs a part or all of steps recorded in the method embodiments.

Figure 5:
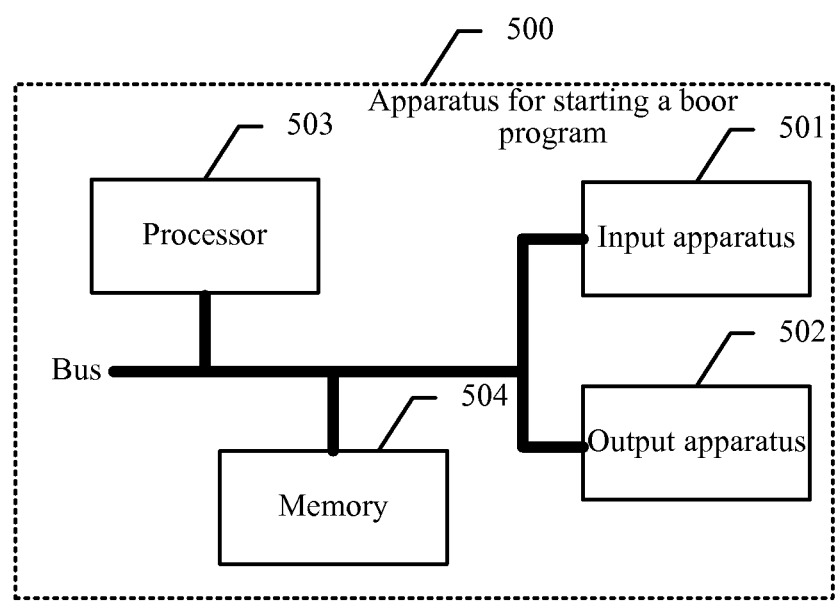
FIG. 5 is a schematic composition diagram of another apparatus for starting a boot program according to an embodiment of the present invention.

An apparatus for starting a boot program according to an embodiment of the present invention is described in the following. Referring to FIG. 5, the apparatus for starting a boot program 500 includes:

an input apparatus 501, an output apparatus 502, a processor 503, and a memory 504 (there may be one or more processors 503 in the apparatus 500 for starting a boot program, and one processor is used as an example in FIG. 5). The input apparatus 501, the output apparatus 502, the processor 503, and the memory 504 may be connected by using a bus or in other manners. A connection by using a bus is used as an example in FIG. 5.

The processor 503 is configured to perform the following steps: when a boot request is detected, determine whether a first physical block operated in a NAND flash is a bad block; if the first physical block is not a bad block, read first boot data stored in the first physical block; determine whether the read first boot data has a data error; if the read first boot data has a data error, re-read the first boot data from a first backup block that is corresponding to the first physical block, where the first backup block is a physical block that backs up data in the first physical block; and determine whether the first boot data that is re-read from the first backup block has a data error; and if the first boot data that is re-read from the first backup block has no data error, continue to process, according to a same manner of processing the first boot data, other boot data that needs to be read to start the boot program, until start of the boot program is complete.

In some embodiments of the present invention, the processor 503 is specifically configured to perform the following steps: read bad block mark information of the first physical block; and determine whether the first physical block is a bad block according to the bad block mark information.

The processor 503 is further configured to perform the following steps: after determining whether the first physical block operated in the NAND flash is a bad block, if the first physical block is a bad block, determine whether a second physical block operated in the NAND flash is a bad block; and if the second physical block is a bad block, continue to determine whether a third physical block operated in the NAND flash is a bad block; and if N consecutive physical blocks in the NAND flash are all determined to be bad blocks, feed back a boot program start failureNAND, where N is a preset boot start threshold and N is a non-zero natural number.

The processor 503 is specifically configured to perform the following steps: use an error checking and correction ECC algorithm to check and correct the read first boot data; and if the checking of the first boot data by using the ECC algorithm fails, determine that the read first boot data has a data error.

The processor 503 is specifically configured to perform the following steps: locate an address of the first boot data that has a data error in the first physical block by using a pointer built in the NAND flash; direct the pointer built in the NAND flash to an address that is the same as a located address and is in the first backup block; and re-read the first boot data from the address that is the same as the located address and in the first backup block.

The processor 503 is specifically configured to perform the following steps: acquire an ID of a page on which the first boot data that has a data error in the first physical block exists; search, in the first backup block, for a page whose ID is the same as that of the page on which the first boot data that has a data error exists; and re-read the first boot data according to the page that is found in the first backup block.

The processor 503 is further configured to perform the following steps: after determining whether the first boot data that is re-read from the first backup block has a data error, if the first boot data that is re-read from the first backup block has a data error, read the first boot data again from a second backup block corresponding to the first physical block, where the second backup block is another physical block that backs up the data in the first physical block; and determine whether the first boot data read again from the second backup block has a data error, and if the first boot data read again from the second backup block has no data error, trigger execution of continuing to process, according to the same manner of processing the first boot data, other boot data that needs to be read to start the boot program, until the start of the boot program is complete.

The processor 503 is further configured to perform the following steps: continue to process, in the first backup block, other boot data than the first boot data; or jump back to the first physical block to continue to process other boot data than the first boot data.

It can be learned from the embodiment that, after a boot request is initiated by a user, a bad block determining module first determines whether a first physical block currently operated in a NAND flash is a bad block when the boot request is detected. Then a data reading module reads first boot data stored in the first physical block if the first physical block is not a bad block. Then an error determining module determines whether the read first boot data has a data error. The data reading module re-reads the first boot data from a first backup block when the read first boot data has a data error. The error determining module determines whether the first boot data that is re-read from the first backup block has a data error, and when the first boot data that is re-read from the first backup block has no data error, the data reading module and the error determining module continue to process, according to the same manner of processing the first boot data, other boot data that needs to be read to start the boot program, until the start of the boot program is complete. Because bad block determination is performed on the first physical block currently operated in the NAND flash, a problem of boot program start failure caused by a bad block problem occurring when the NAND flash is delivered out of a factory or during use of the NAND flash can be avoided. In addition, when the read first boot data has a data error, the first boot data may be re-read from the first backup block that is corresponding to the first physical block. In this way, a remedy can be taken when a data error is found, and the re-read first boot data cab still be used to start the boot program. Compared with the prior art where a boot failure is directly fed back when a data error occurs, a probability of successful start of the boot program can be increased. Furthermore, it should be noted that the described apparatus embodiments are merely exemplary. The units described as separate parts may or may not be physically separate, and parts displayed as units may or may not be physical units, may be located in one position, or may be distributed on a plurality of network units. A part or all of the modules may be selected according to an actual need to achieve the objectives of the solutions of the embodiments. In addition, in the accompanying drawings of the apparatus embodiments provided in the present invention, connectivity between modules indicates there is a communications connection between them, and the communications connection may specifically be one or more communications buses or signal cables. Persons of ordinary skill in the art may understand and implement the embodiments of the present invention without creative efforts.

Based on the descriptions of the embodiments, persons of skilled in the art may clearly understand that the present invention may be implemented by software in addition to necessary universal hardware, or by application-specific hardware only. The dedicated hardware includes an application-specific integrated circuit, an application-specific CPU, an application-specific memory, and an application-specific component. In general, a function that is completed by a computer program can be easily implemented by corresponding hardware, and the same function may be implemented by various specific hardware structures, such as an analog circuit, a digital circuit, or an application-specific circuit. However, for the present invention, a software program is a preferred implementation manner. Based on such an understanding, the technical solutions of the present invention essentially or the part contributing to the prior art may be implemented in a form of a software product. The software product is stored in a readable storage medium, such as a floppy disk, a USB flash drive, a removable hard disk, a Read-Only Memory (ROM), a Random Access Memory (RAM), a magnetic disk, or an optical disc of a computer, and includes several instructions for instructing a computer device (that may be a personal computer, a server, or a network device) to perform the methods described in the embodiments of the present invention.

The embodiments are merely intended to describe the technical solutions of the present invention other than limit the present invention. Although the present invention is described in detail with reference to the embodiments, persons of ordinary skill in the art should understand that they may still make modifications to the technical solutions described in the embodiments or make equivalent replacements to some technical features thereof, without departing from the spirit and scope of the technical solutions of the embodiments of the present invention.

What is claimed is:

1. A method for starting a boot program, comprising:
   in response to detecting a boot request, determining whether a first physical block in a NAND flash is a bad block;
   reading first boot data stored in the first physical block if the first physical block is not a bad block;
   determining whether the read first boot data has a data error;
   if the read first boot data has a data error, re-reading the first boot data from a first backup block that corresponds to the first physical block, wherein the first backup block is a physical block that backs up data in the first physical block; and
   determining whether the first boot data that is re-read from the first backup block has a data error, and if the first boot data that is re-read from the first backup block has no data error, continuing to process, according to a same manner of processing the first boot data, other boot data that needs to be read to start the boot program, until a start of the boot program is complete.

2. The method according to claim 1, wherein the determining whether a first physical block in a NAND flash is a bad block comprises:
   reading a bad block mark of the first physical block; and
   determining whether the first physical block is a bad block according to the bad block mark.

3. The method according to claim 1, after the determining whether a first physical block in a NAND flash is a bad block, further comprising:
   if the first physical block is a bad block, determining whether a second physical block in the NAND flash is a bad block; and
   if the second physical block is a bad block, continuing to determine whether a third physical block in the NAND flash is a bad block, and if N consecutive physical blocks in the NAND flash are all determined to be bad blocks, feeding back a boot program start failure, wherein N is a preset boot start threshold and N is a non-zero natural number.

4. The method according to claim 1, wherein the determining whether the read first boot data has a data error comprises:
   using an error checking and correction ECC algorithm to check and correct the read first boot data, and if the checking of the read first boot data by using the ECC algorithm fails, determining that the read first boot data has a data error.

5. The method according to claim 1, wherein the re-reading the first boot data from a first backup block that corresponds to the first physical block comprises:
   locating an address of the first boot data that has a data error in the first physical block using a pointer built in the NAND flash;
   directing the pointer built in the NAND flash to an address that is the same as the located address and is in the first backup block; and
   re-reading the first boot data from the address that is the same as the located address and is in the first backup block.

6. The method according to claim 1, wherein the re-reading the first boot data from a first backup block that corresponds to the first physical block comprises:
   acquiring an identity (ID) of a page on which the first boot data that has a data error in the first physical block exists;
   searching, in the first backup block, for a page whose ID is the same as that of the page on which the first boot data that has a data error exists; and
   re-reading the first boot data according to a page that is found in the first backup block.

7. The method according to claim 1, after the determining whether the first boot data that is re-read from the first backup block has a data error, further comprising:
   if the first boot data that is re-read from the first backup block has a data error, reading the first boot data from a second backup block that corresponds to the first physical block, wherein the second backup block is another physical block that backs up the data in the first physical block; and determining whether the first boot data read from the second backup block has a data error, and if the first boot data read from the second backup block has no data error, triggering execution of continuing to process, according to the same manner of processing the first boot data, other boot data that needs to be read to start the boot program, until the start of the boot program is complete.

8. The method according to claim 1, wherein the continuing to process other boot data that needs to be read to start the boot program comprises:

continuing to process, in the first backup block, boot data other than the first boot data; or jumping back to the first physical block to continue to process boot data other than the first boot data.

9. An apparatus for starting a boot program, comprising a processor and a non-transitory processor-readable medium having processor-executable instructions stored thereon, the processor-executable instructions including a plurality of modules, the modules including:

a bad block determining module, configured to, in response to detection of a boot request, determine whether a first physical block in a NAND flash is a bad block;

a data reading module, configured to, if the first physical block is not a bad block, read first boot data stored in the first physical block; and an error determining module, configured to determine whether the read first boot data has a data error; wherein the data reading module is further configured to, when the read first boot data has a data error, re-read the first boot data from a first backup block that corresponds to the first physical block, wherein the first backup block is a physical block that backs up data in the first physical block; and the error determining module is further configured to determine whether the first boot data that is re-read from the first backup block has a data error; and when the first boot data that is re-read from the first backup block has no data error, continue to trigger, according to a same manner of processing the first boot data, the data reading module and the error determining module to process other boot data that needs to be read to start the boot program, until start of the boot program is complete.

10. The apparatus according to claim 9, wherein the bad block determining module is specifically configured to read a bad block mark of the first physical block; and determine whether the first physical block is a bad block according to the bad block information.

11. The apparatus according to claim 9, wherein the apparatus for starting a boot program further comprises: a feedback module, the bad block determining module is further configured to, when the first physical block is a bad block, determine whether a second physical block in the NAND flash is a bad block;

the bad block determining module is further configured to, when the second physical block is a bad block, continue to determine whether a third physical block in the NAND flash is a bad block; and the feedback module is configured to feed back a boot program start failure when N consecutive physical blocks in the NAND flash are all determined to be bad blocks, wherein N is a preset boot start threshold and N is a non-zero natural number.

12. The apparatus according to claim 9, wherein the error determining module is configured to use an error checking and correction ECC algorithm to check and correct the read first boot data; and if the checking of the read first boot data using the ECC algorithm fails, determine that the read first boot data has a data error.

13. The apparatus according to claim 9, wherein the data reading module comprises:

a pointer locating submodule, configured to locate an address of the first boot data that has a data error in the first physical block using a pointer built in the NAND flash;

a pointer directing submodule, configured to direct the pointer built in the NAND flash to an address that is the same as the located address and is in the first backup block; and a first data reading submodule, configured to re-read the first boot data from the address that is the same as the located address and is in the first backup block.

14. The apparatus according to claim 9, wherein the data reading module comprises:

a page acquiring submodule, configured to acquire an identity (ID) of a page on which the first boot data that has a data error in the first physical block exists;

a searching submodule, configured to search, in the first backup block, for a page whose ID is the same as that of the page on which the first boot data that has a data error exists; and a second data reading submodule, configured to re-read the first boot data according to a page that is found in the first backup block.

15. The apparatus according to claim 9, wherein the data reading module is further configured to, when the error determining module determines that the first boot data that is re-read from the first backup block has a data error, read the first boot data from a second backup block that corresponds to the first physical block, wherein the second backup block is another physical block that backs up the data in the first physical block; and the error determining module is further configured to determine whether the first boot data read from the second backup block has a data error; and when the first boot data read from the second backup block has no data error, trigger the data reading module and the error determining module to process other boot data that needs to be read to start the boot program, until the start of the boot program is complete.

16. The apparatus according to claim 9, wherein the data reading module is further configured to continue to read, in the first backup block, boot data other than the first boot data, or jump back to the first physical block to continue to read boot data other than the first boot data; and the error determining module is further configured to continue to determine, in the first backup block, whether the boot data other than the first boot data has a data error, or jump back to the first physical block to continue to determine whether the boot data other than the first boot data has a data error.

* * * * *